United States Patent [19]

Leisner

[11] 4,198,775
[45] Apr. 22, 1980

[54] FISHING ROD HOLDER

[76] Inventor: Theodore Leisner, P.O. Box 192, Chiloquin, Oreg. 97624

[21] Appl. No.: 938,379

[22] Filed: Aug. 31, 1978

Related U.S. Application Data

[63] Continuation-in-part of Ser. No. 827,355, Aug. 24, 1977, abandoned.

[51] Int. Cl.² ............................................. A01K 97/10
[52] U.S. Cl. .................................................... 43/21.2
[58] Field of Search ................................... 43/21.2, 17

[56] References Cited

U.S. PATENT DOCUMENTS

| 2,995,855 | 8/1961 | Bell | 43/21.2 |
| 3,903,633 | 9/1975 | Hutcherson | 43/21.2 |

Primary Examiner—Robert C. Watson
Attorney, Agent, or Firm—James D. Givnan, Jr.

[57] ABSTRACT

A fishing rod holder including a rod receptacle having a casing within which is rotatably mounted a cylinder both having lengthwise openings to receive a laterally inserted rod handle. The cylinder opening is closed by the casing upon cylinder rotation. A clamping assembly carries the casing and is positionable along a curved support member to vary rod inclination. The clamping assembly permits fore and aft movement of the rod tip to determine if a fish is on.

10 Claims, 12 Drawing Figures

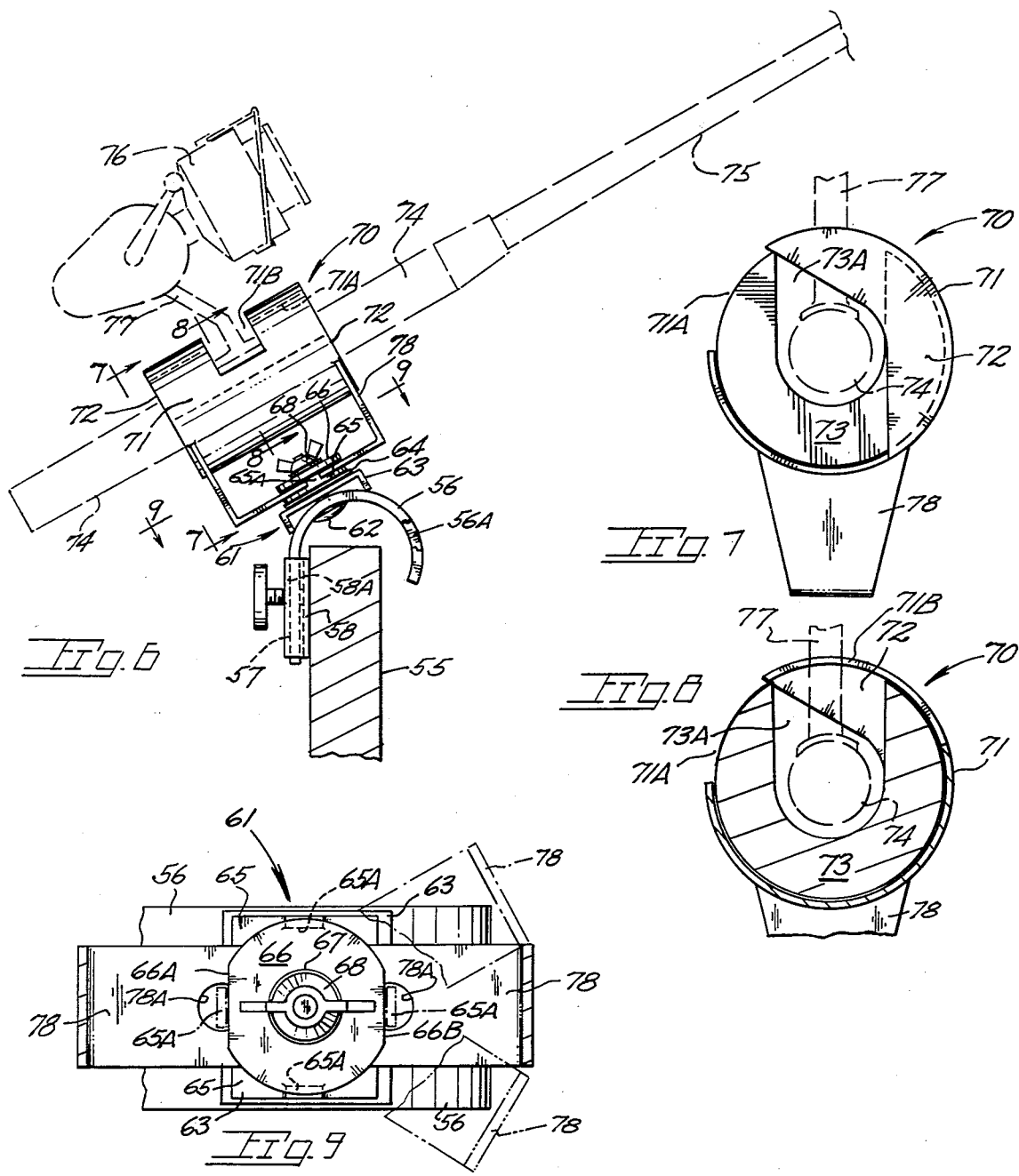

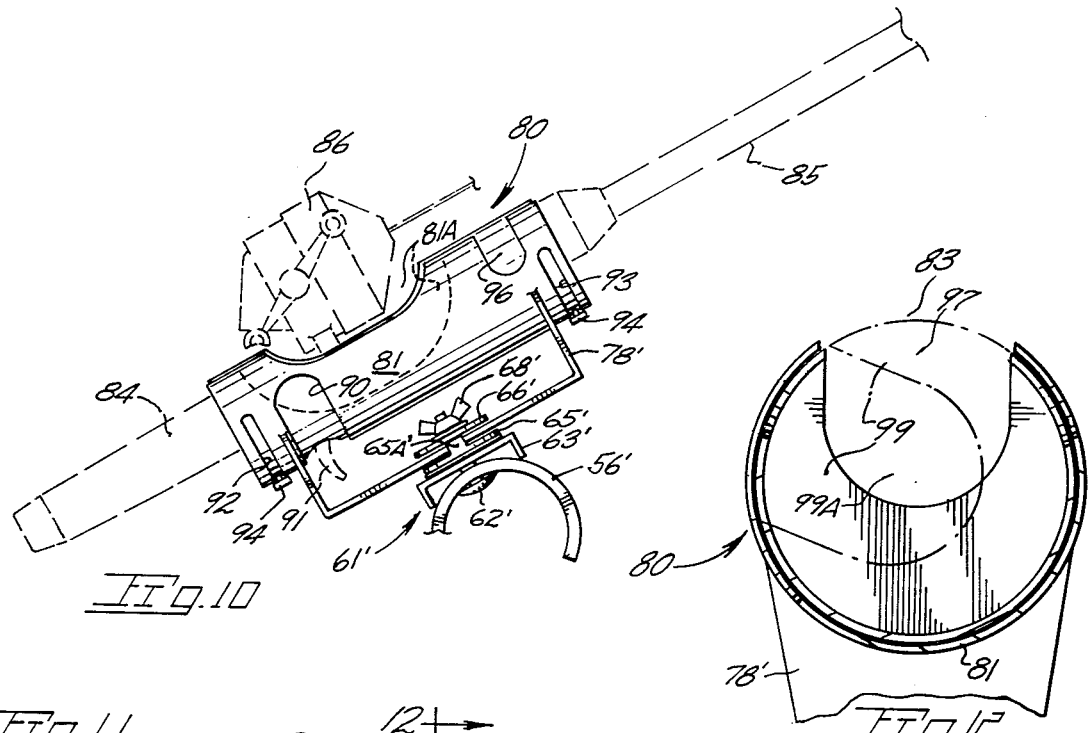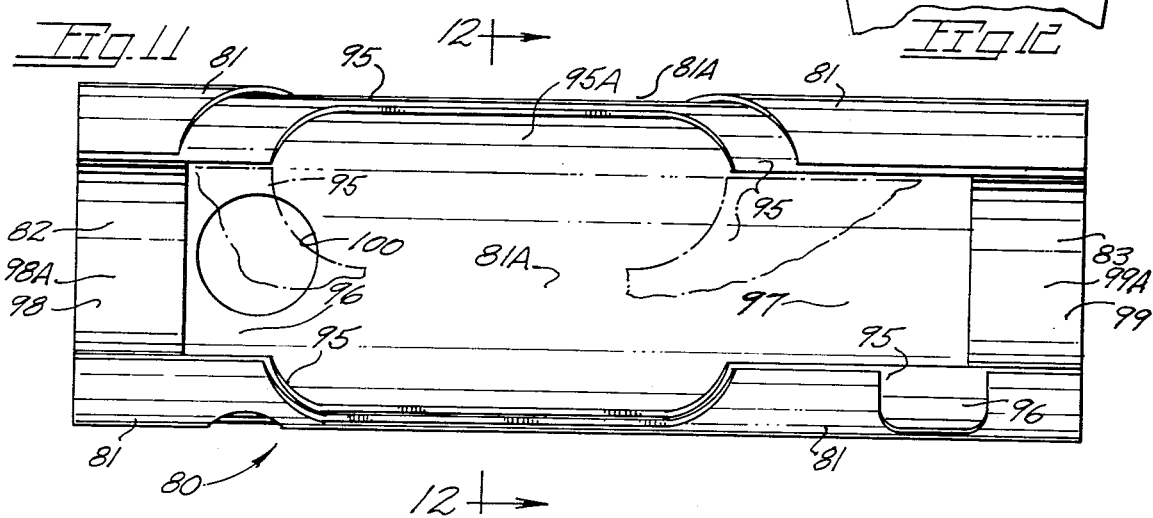

FISHING ROD HOLDER

BACKGROUND OF THE INVENTION

The present application is a continuation-in-part application of my copending U.S. patent application bearing the same title and filed Aug. 24, 1977 under Ser. No. 827,355 now abandoned.

The present invention concerns generally rod holders affixable to the gunwale of a boat.

The use of rod holders is commonplace to relieve the person fishing of the tiring task of holding the rod. Most such rod holders provide for the convenient release of the rod to enable playing of the fish in the usual manner.

SUMMARY OF THE PRESENT INVENTION

The present invention is embodied within a rod holder adjustably attachable to the gunwale of a boat and permits both convenient insertion and release of a fishing rod handle while positively retaining same against inadvertent release.

The present rod holder is embodied within a cylindrical casing within which is rotatably mounted a cylinder shaped to receive various types of fishing rod handles associated with open face and closed face spinning reels as well as a bait casting reel to provide a highly adaptable fishing rod holder. The rod receptacle, as briefly described above, is supported by a curved support member with a clamping assembly positionable and locable along the curved support member to enable positioning of the rod at the desired inclination. Further, the clamping assembly additionally enables rod receptacle movement about an upright axis to permit the user to move the rod in a limited manner for purposes of determining whether or not a fish has been hooked. Other objects of the invention will be obvious from an understanding of the following description.

BRIEF DESCRIPTION OF THE DRAWING

In the accompanying drawing:

FIG. 6 is a side elevational view of a modified form of rod holder for open face spinning reels;

FIG. 7 is an end elevational view taken along line 7—7 of FIG. 6;

FIG. 8 is a vertical sectional view taken along line 8—8 of FIG. 6;

FIG. 9 is a sectional view taken downwardly along line 9—9 of FIG. 6;

FIG. 10 is a side elevational view of still another modified form of the rod holder;

FIG. 11 is a plan view of the rod holder receptacle of FIG. 10 with the rod handle and reel removed; and FIG. 12 is a sectional view of the rod receptacle taken along line 12—12 of FIG. 11.

DETAILED DESCRIPTION OF THE PREFERRED EMBODIMENTS

Figure 1:
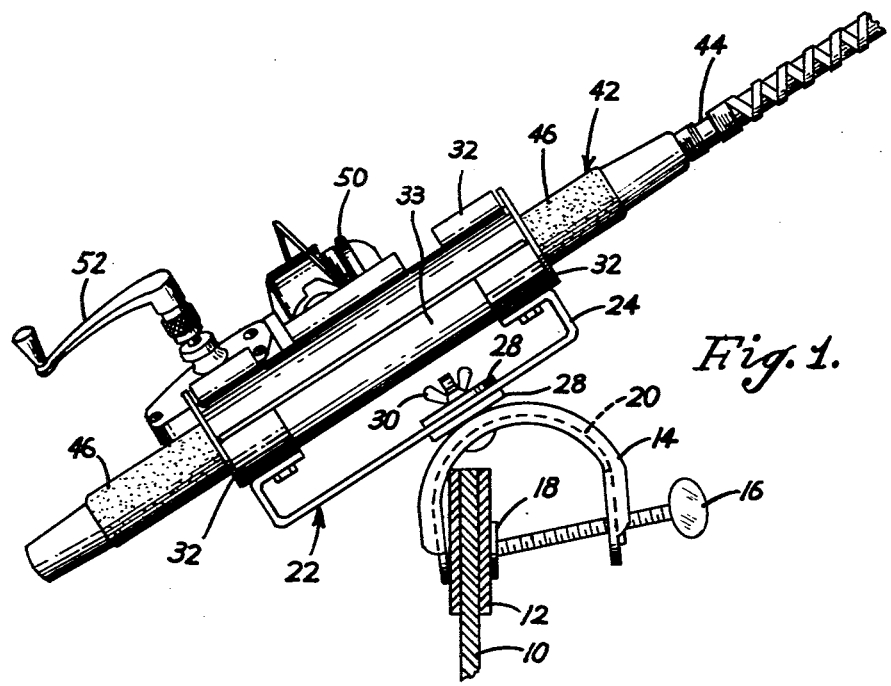
FIG. 1 is a fragmentary view in side elevation showing essential parts of a fishing rod and a boat side, together with means for adjustably and operatively holding a fishing rod and line on a side of the boat.
Figure 2:
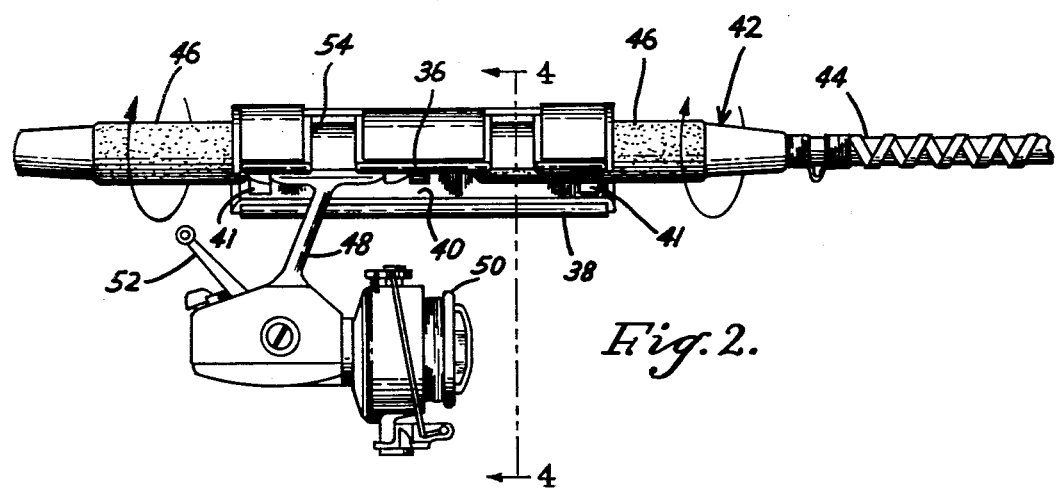
FIG. 2 is a fragmentary plan view of the structure shown in FIG. 1, but with the parts readjusted to a condition in which the rod and line can be withdrawn from the holder.
Figure 3:
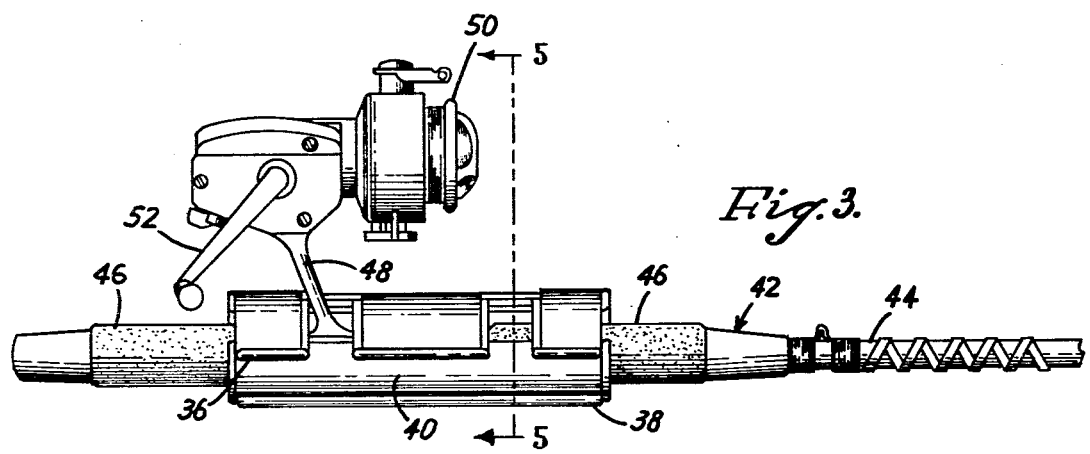
FIG. 3 is a view similar to FIG. 2 but with the rod and line carrying means swung to an operative position.
Figure 4:
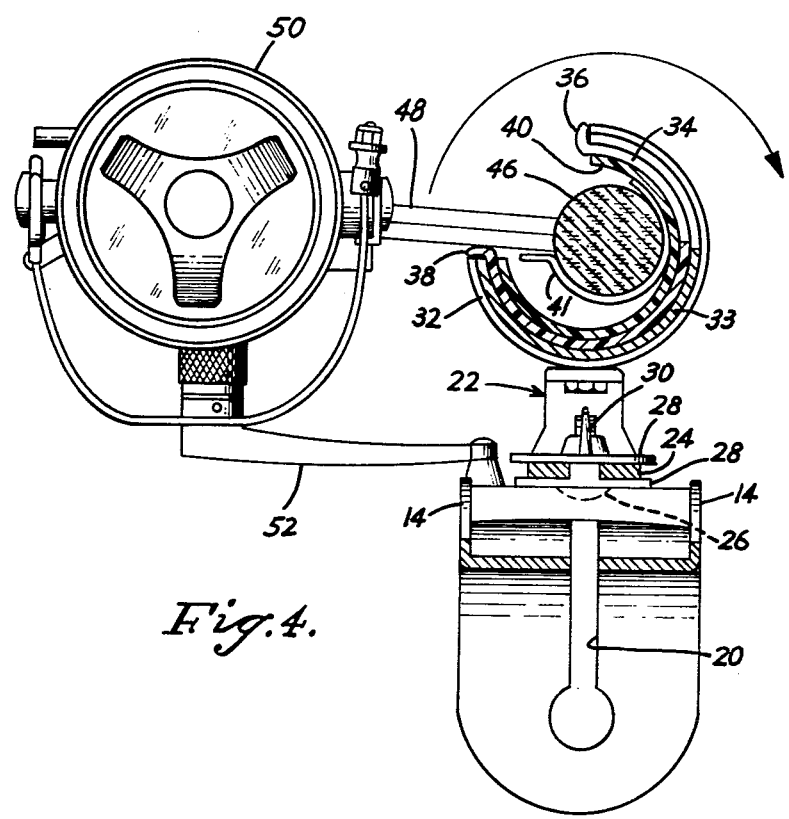
FIG. 4 is a view in sectional elevation, the section being taken along the line 4—4 of FIG. 2, looking in the direction of the arrows.
Figure 5:
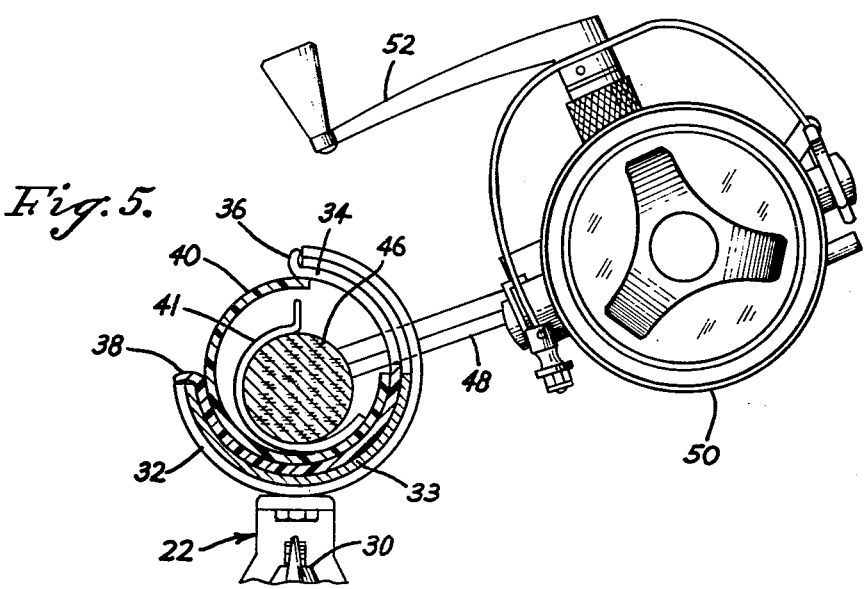
FIG. 5 is a view in sectional elevation, the section being taken along line 5—5 of FIG. 3, looking in the direction of the arrows.

As seen in FIG. 1 a boat side 10 terminates in a gunwale 12 to which a semi-circular clamping member 14 is detachably affixed by a thumb screw 16. The member 14 is formed with a circular opening through which the shank of the screw 16 passes. When the screw 16 is turned clockwise it presses a washer 18 firmly against the gunwale 12 and thereby clamps the member firmly to a boat side.

The member 14 has a circumferentially extending groove indicated by the broken line 20. When the thumb screw 16 is turned firmly home, the member 14 is held fixedly in place.

The fishing line and rod carrier 22 includes an elongated longitudinally slotted, bracket 24 which is adjustably connected to the member 14 through a screw 26, a pair of clamping washers 28—28 and a wing nut 30.

The bracket 24 has inturned ends affixed to partial metallic sleeves 32. The partial metallic sleeves 32 extend around end portions of a partial metallic sleeve 33. The sleeve 33 has a gap, about sixty degrees in width, which extends for its full length. Two additional gaps, each about sixty degrees in length and about an inch across are spaced inwardly equally from opposite ends of the sleeve.

A generally substantially identical plastic sleeve 34 of slightly smaller diameter serves as a spacer and fits fixedly within the sleeve 33 and is restrained against rotation by outturned flange portions 36 and 38. Within the fixed sleeve member 34 a partial sleeve 40 of plastic is revolvubly mounted, the sleeve 40 being free to turn within and relative to the sleeve member 34.

The fishing rod 42 may be of conventional construction. As illustrated it comprises a rod portion 44 and a handle portion 46. The handle portion 46 carries a stem 48 on which a conventional reel 50 and reel operating handle 52 are mounted.

The plastic sleeve 40 has affixed to its inner surface at its opposite ends rod holding springs 41.

When it is desired to install the pole and associated structures in the mount, the inner sleeve is adjusted to align its slot with the long slot of the outer sleeve, the rod is inserted to align the stem 48 with a slot 54, and is turned into the slot.

The rod may be reversed end for end relative to the holder.

In FIGS. 6 through 9 I show a modified form of the rod holder which, as before, is mounted to a gunwale 55 of a boat. A semi-circular support member 56 defines a lengthwise extending slot 56A. A straight segment 57 of the clamping member slidably engages a base 58 flanged along its sides at 58A. A locking screw is threadedly engaged with said straight segment of the bracket and upon advancement serves to lock support member 56 by biasing its straight segment outwardly against flanges 58A. Base 58 may be permanently affixed to the boat by suitable fasteners.

Disposed for arcuate sliding travel on semi-circular support member 56 is a clamp assembly generally at 61 and including a screw 62 projecting upwardly through a flanged fitting 63 the flanges of which bear upon the support member. A friction washer at 64 is disposed intermediate said fitting and washer 65 the latter having upturned ears or projections 65A. Supported by said ears are washers 66 and 67 while a wing nut 68 on screw 62 secures the clamp assembly to the semi-circular support member 56. Washer 66 has opposed chordal edges 66A-66B as seen in FIG. 9.

A rod receptacle is indicated generally at 70 and includes a cylindrical casing 71 partially closed at its ends by plates 72. Within casing 71 is a bifurcated cylinder 73 defining a lengthwise open area 73A for reception of a rod handle 74 of a rod 75 of the type usable with an open face spinning reel 76. Bifurcated cylinder 73 is freely rotatably within casing 71 to communicate its open area 73A with a lengthwise extending open area 71A in the casing to permit lateral extraction and insertion of the rod handle. A transverse arcuate opening 71B in the casing receives the stem 77 of the spinning reel. A bracket 78 on the casing is swingably received between eared washer 65 and superjacent chordal washer 66 by reason of washer ears 65A preventing clamping of the intermediate bracket portion. Accordingly bracket 78 may pivot about the axis of screw 62 until contact with an ear 65A to permit the fisherman to periodically "test" the action of a trolled lure or determine if a fish has been hooked. If so desired, eared washer 65 may be repositioned ninety degrees to locate its ears for insertion into bracket openings 78A (FIG. 9) in which instance the chordal sides 66A-66B of washer 66 may slide therepast permitting washer abutment against the bracket to hold same against rotation.

In FIGS. 10, 11 and 12 I show a further modified form of the invention which includes a different rod receptacle but retaining the same type of support member, indicated 56', and a clamping assembly at 61' as that illustrated in FIGS. 6 through 9. The rod receptacle, generally at 80, includes a cylindrical casing 81 having open areas 82 and 83 adjacent each end thereof and a central open area 81A through which the handle 84 of a rod 85 may laterally pass during insertion and removal. Rod 85 is the type for use with a closed face spinning reel 86. The enlarged central open area 81A is also for reception of reel 86. An arcuate casing opening at 90 receives the fingergrip 91 of the rod handle and extends arcuately about ninety degrees to permit fingergrip rotation. Slots 92 and 93 adjacent each casing end receive limit stops 94 to limit rotational movement and prevent axial movement of a cylinder, later described, within said casing. An arcuate opening at 96 optionally receives the fingergrip of an inverted bait casting rod (not shown) upon the casing 81 being turned end-for-end.

A cylinder 95 is rotatably confined within the casing and is of hollow construction having open areas 96-97 corresponding generally with casing open areas 82-83, and which are partially closed by end blocks 98-99 which have aligned recesses 98A-99A therein which receive and support the inserted rod handle. A cylinder opening 100 receives the fingergrip 91 of the rod handle.

With the casing open areas in register with the cylinder open areas, as shown in FIG. 12, the rod handle may be lowered into placement within the cylinder with handle segments resting on the cylinder end blocks 98-99. With attention to FIG. 11 it will be seen that counterclockwise rotation of the cylinder will cause the cylinder open areas 95A, 96 and 97 to be closed by the casing to thereby confine the rod handle against dislodgement. Rod handle release in the event of a strike entails only partial rotation of cylinder 95 by rotation of the rod handle whereupon the handle may be lifted free of the holder. The other features of the clamping assembly are, as aforesaid, associated with this form of the invention.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

I claim:

1. A fishing rod holder for mounting on the gunwale of a boat, said holder comprising,
   a support member of semi-circular configuration, means mounting said support member to the gunwale,
   a clamping assembly slidably and lockably disposed on said support member,
   a rod receptacle supported by said clamping assembly and comprising a casing defining a lengthwise extending open area, a cylinder disposed within said casing and rotatable relative thereto, said cylinder having lengthwise orientated open areas substantially registerable with the casing open area to permit lateral insertion of a rod handle into cylinder engagement whereafter cylinder rotation will cause said casing to close the cylinder openings to assure rod handle retention.

2. The rod holder claimed in claim 1 wherein said support member defines a lengthwise orientated slot, said clamping assembly positionable and lockable along the semi-circular support member for purposes of positioning a fishing rod within the holder at a desired transverse inclination relative the boat gunwale.

3. The rod holder claimed in claim 2 wherein said clamping assembly includes a flanged fitting for abutment at spaced apart points with said semi-circular support member, a fastener for urging the flanged fitting into support member abutment.

4. The rod holder claimed in claim 3 wherein said clamping assembly includes washers disposed oppositely adjacent a bracket of the rod receptacle, one of said washers having projections thereon, the remaining washer adapted to engage said projections so as to prevent frictional locking engagement of the remaining washer with the bracket whereby the rod holder and the rod therein are freely positionable about the fastener axis.

5. The rod holder claimed in claim 4 wherein said remaining washer has chordal edges which upon rotational adjustment of the remaining washer enables avoidance of projection contact with resultant seating of the last mentioned washer into locking engagement with the rod holder bracket to prevent rotation of same about the fastener axis.

6. The rod holder claimed in claim 1 wherein said casing is partially closed at its ends by end plates, a transverse arcuate opening in the casing adapted to receive the stem of an open faced reel mounted on the rod.

7. The rod holder claimed in claim 1 wherein said casing and said cylinder define each openings for the reception of a rod handle fingergrip, said casing opening being of elongate shape to permit rotational movement of the fingergrip.

8. The rod holder claimed in claim 7 wherein said casing additionally defines an arcuate opening for reception of the stem of an open faced spinning reel.

9. The rod holder claimed in claim 7 wherein said casing additionally defines centrally located open areas for reel reception.

10. The rod holder claimed in claim 9 wherein said cylinder includes bifurcated end blocks for rod handle reception.

* * * * *